(12) United States Patent
Chen

(10) Patent No.: US 11,170,252 B2
(45) Date of Patent: Nov. 9, 2021

(54) FACE RECOGNITION METHOD AND COMPUTER SYSTEM THEREOF

(71) Applicant: Wistron Corporation, New Taipei (TW)

(72) Inventor: Yen-Yu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 57 days.

(21) Appl. No.: 16/716,503

(22) Filed: Dec. 17, 2019

(65) Prior Publication Data

US 2021/0081703 A1 Mar. 18, 2021

(30) Foreign Application Priority Data

Sep. 16, 2019 (TW) .................. 108133214

(51) Int. Cl.
*G06K 9/32* (2006.01)
*G06K 9/62* (2006.01)
*G06K 9/00* (2006.01)

(52) U.S. Cl.
CPC ....... *G06K 9/6202* (2013.01); *G06K 9/00228* (2013.01); *G06K 9/3233* (2013.01)

(58) Field of Classification Search
CPC .............. G06K 9/6202; G06K 9/3233; G06K 9/00228; G06K 9/00899; G06T 7/194; G06T 2207/30201
USPC ....... 382/100, 115, 118, 173, 195, 181, 190, 382/103, 162, 164, 254, 275
See application file for complete search history.

(56) References Cited

U.S. PATENT DOCUMENTS

| 7,876,320 | B2 * | 1/2011 | Marugame .............. G06T 17/10 345/420 |
| 8,441,548 | B1 * | 5/2013 | Nechyba ............ G06K 9/00221 348/222.1 |
| 8,515,124 | B2 * | 8/2013 | Yoo .......................... G06K 9/00 382/100 |
| 9,025,830 | B2 * | 5/2015 | Ma ..................... G06K 9/00261 382/107 |
| 10,163,027 | B2 * | 12/2018 | Yano ....................... G06T 5/002 |
| 10,198,645 | B2 * | 2/2019 | Graumann ............... G09C 5/00 |
| 2007/0183661 | A1 * | 8/2007 | El-Maleh ............. G06K 9/3233 382/173 |
| 2008/0165187 | A1 | 7/2008 | Marugame |
| 2013/0188840 | A1 * | 7/2013 | Ma ..................... G06K 9/00261 382/107 |
| 2014/0015930 | A1 * | 1/2014 | Sengupta ................ G06F 21/32 348/46 |
| 2014/0270412 | A1 * | 9/2014 | Ma ..................... G06K 9/00221 382/118 |
| 2018/0158269 | A1 * | 6/2018 | Friedman ........... G06K 9/00228 |
| 2018/0357500 | A1 * | 12/2018 | Lin .................... G06K 9/00899 |

(Continued)

FOREIGN PATENT DOCUMENTS

CN 103810463 A 5/2014
CN 109271848 A 1/2019

*Primary Examiner* — Sheela C Chawan
(74) *Attorney, Agent, or Firm* — Winston Hsu

(57) ABSTRACT

A face recognition method includes capturing a background of an image; after determining that a face exists in the image, determining a face region of interest (ROI) of the face; capturing a foreground of the image with the face; and comparing the face ROI and the foreground of the image to determine whether the face is authentic or not.

10 Claims, 5 Drawing Sheets

(56) References Cited

U.S. PATENT DOCUMENTS

2019/0026544 A1* 1/2019 Hua ..................... A61B 5/1128
2019/0188456 A1* 6/2019 Shibata .............. G06K 9/00275

* cited by examiner

FACE RECOGNITION METHOD AND COMPUTER SYSTEM THEREOF

BACKGROUND OF THE INVENTION

1. Field of the Invention

The present invention relates to a face recognition method and a computer system thereof, and more particularly, to a face recognition method and a computer system thereof capable of effectively recognizing authentic faces.

2. Description of the Prior Art

With the advancement and development of technology, face recognition systems for identity recognition by utilizing visual characteristic information of face are widely implemented in many environments, e.g. smart cellular devices or building management systems. A conventional face recognition system usually performs the face recognition for a face of a user with Red/Green/Blue (RGB) cameras without additional sensors. However, when the user shows a photo with a face and tries to pass the face recognition system, the conventional face recognition system might be cheated by the face on the photo. In order to solve the abovementioned problem, the conventional technique recognizes the face in a captured image by its reflection effect, or by brightness characteristics of the captured image, so as to distinguish whether the face in the image is authentic or not. However, the reflection effect of the image is not stable for recognition and is sensitive to a variation of light sources, which easily affect the efficiency of recognition. Therefore, improvements are necessary to the conventional technique.

SUMMARY OF THE INVENTION

Therefore, the present invention provides a face recognition method and computer system thereof to effectively recognize the authentic face by the conventional face recognition system, which is equipped with the RGB camera, to improve the safety of face recognition.

An embodiment of the present invention discloses a face recognition method, comprising: capturing a background of an image; after determining that a face exists in the image, determining a face region of interest (ROI) of the face; capturing a foreground of the image with the face; and comparing the face ROI and the foreground of the image to determine whether the face is authentic or not.

Another embodiment of the present invention discloses a computer system, for executing a face recognition method, comprising: an image capturing device, configured to capture an image; and a processing device, coupled to the image capturing device, configured to capture a background of an image; determine a face region of interest (ROI) of the face after determining that a face exists in the image; capture a foreground of the image with the face; and compare the face ROI and the foreground of the image to determine whether the face is authentic or not.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
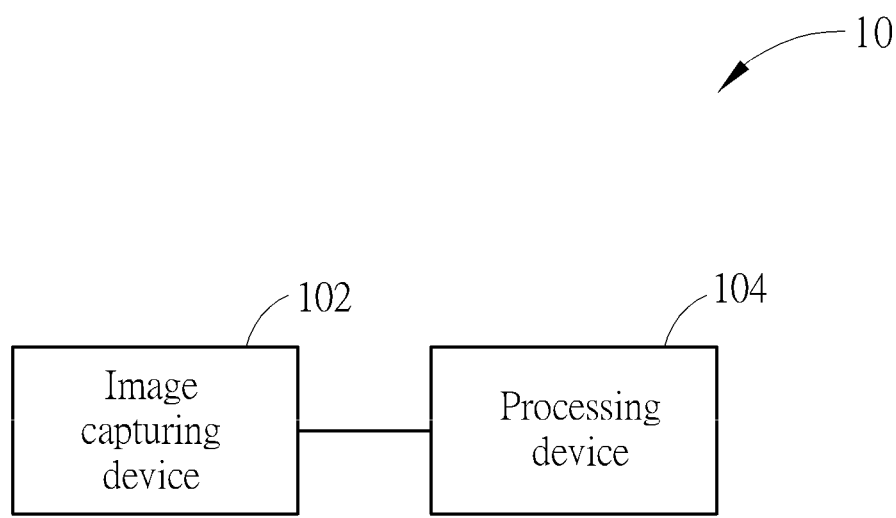
FIG. 1 is a schematic diagram of a computer system according to an embodiment of the present invention.

Please refer to FIG. 1, which is a schematic diagram of a computer system 10 according to an embodiment of the present invention. The computer system 10 includes an image capturing device 102 and a processing device 104. The computer system 10 may be a face recognition system. The image capturing device 102 is configured to capture an image, the image capturing device 102 may be a Red/Green/Blue (RGB) camera or an infrared (IR) camera and is fixedly installed in an environment. In other words, a background of the image captured by the image capturing device 102 of the computer system 10 is not arbitrarily changed. The processing device 104 may be a central processing unit (CPU), a controller or a computing device of the computer system 10, which is configured to perform the face recognition for the image captured by the image capturing device 102. In detail, the processing device 104 may be utilized for capturing the background of the image captured by the image capturing device 102. After determining that a face exists in the image, a face region of interest (ROI) of the face is determined and a foreground of the image with the face is captured, so as to compare the face ROI and the foreground of the image to determine whether the face is authentic or not. Therefore, the computer system 10 according to an embodiment of the present invention is not required to implement additional sensors, and is capable of determining whether the face in the image captured by the image capturing device 102 is authentic or not by the background and the foreground of the image.

Figure 2:
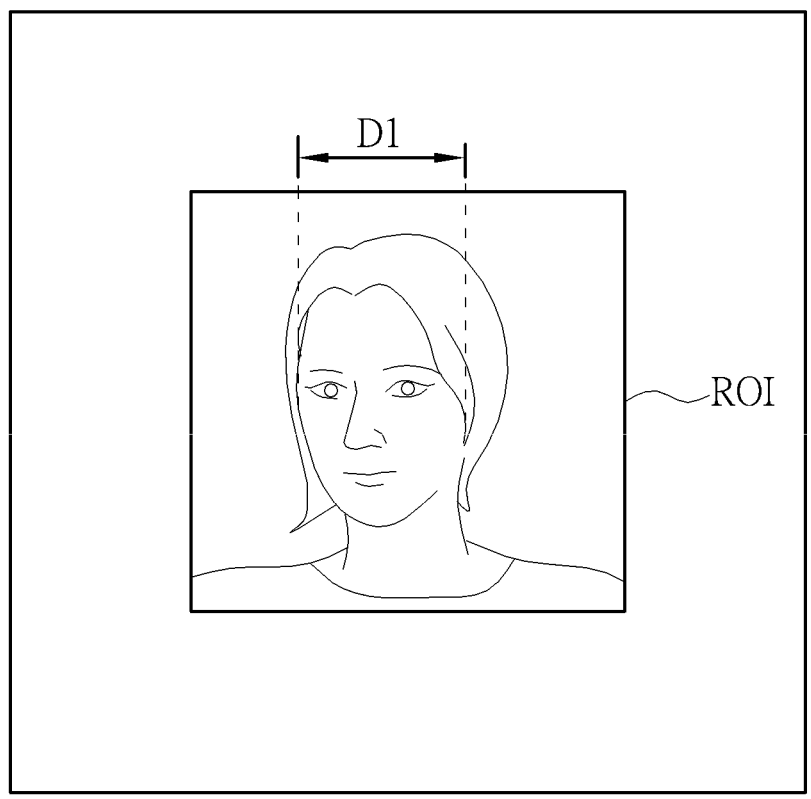
FIG. 2 is a schematic diagram of a face region of interest (ROI) according to an embodiment of the present invention.

In detail, after the computer system 10 is implemented, the image capturing device 102 is configured to obtain the background of the image in the environment without any moving object. Then, please refer to FIG. 2, which is a schematic diagram of the face ROI according to an embodiment of the present invention. When the processing device 104 detects that the face exists in the image captured by the image capturing device 102, a size (in pixels) of the face in the image is obtained to determine a landmark of the face, then face is shrank or enlarged based on a width D1 of the face. Since the image surrounding the face may be utilized for determining whether the face is authentic or not, the processing device 104 is configured to expand a region of the landmark to determine the face ROI in the image. In an embodiment, the processing device 104 shrinks or enlarges the width D1 of the face in the image to 100 pixels, e.g. an original image is 600*300 pixels and the original width of the face is 80 pixels. Therefore, the processing device 104 takes a ratio of 100 pixels to the width of the original face as a standard, enlarges the image to 750*375 pixels based on the landmark, and then determines the face ROI with a fixed size. In an embodiment, a size of the face ROI is 224*224 pixels, a size from a chin of the landmark to a bottom of the face ROI is 20 pixels, and sizes of laterals of the landmark to boundaries of the face ROI are 62 pixels. Thus, after the processing device 104 according to an embodiment of the present invention detects the face in the image, the face is centered in the face ROI and the image surrounding the face is kept in the face ROI.

Notably, the sizes of the width D1 and the face ROI are not limited to the above embodiments. In addition, the present invention may detect whether a face exists in the image or not by a Dilb face recognition algorithm to obtain the landmark of the face, and not limited thereto, other face detection algorithms are applicable to the present invention.

After the processing device 104 determines the face exists in the image and the face ROI in the image, the processing device 104 captures the foreground of the image with the face. In an embodiment, the present invention may binarize the image by a differential absolute (absdiff) algorithm to capture the foreground of the image, but not limited thereto, other algorithms which may separate the foreground and the background of the image are applicable to the present invention.

Figure 3:
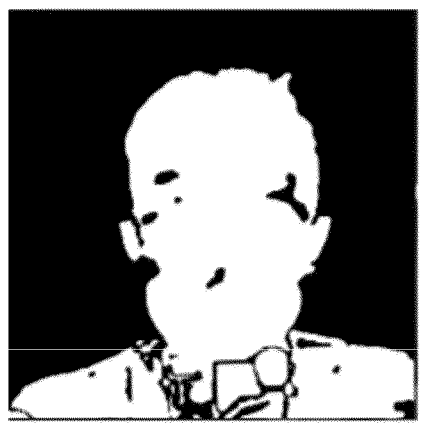
FIG. 3 is a schematic diagram of an authentic face processed by a processing device according to an embodiment of the present invention.

After the processing device 104 obtains the face ROI and the foreground of the image, the processing device 104 combines the face ROI and the foreground of the image to obtain the face in the foreground. In an embodiment, please refer to FIG. 3, which is a schematic diagram of an authentic face processed by a processing device 104 according to an embodiment of the present invention. When the face captured by the image capturing device 102 is authentic, and the face is combined with the face ROI and the foreground of the image, the image shown in FIG. 3 is obtained, wherein a white area represents the authentic face and a black area represents the background.

Figure 4:
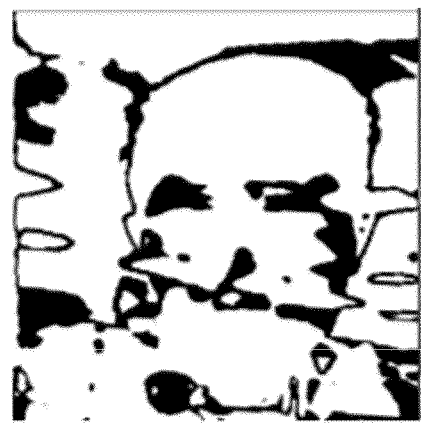
FIG. 4 is a schematic diagram of a photo face processed by the processing device.

On the other hand, please refer to FIG. 4, which is a schematic diagram of a photo face processed by the processing device 104. Notably, the background area outside the authentic face is almost black in FIG. 3, but in FIG. 4, the background area outside the photo face is almost white. That it, the surrounding of the authentic face is a part of the background of the image, and the surrounding of the photo face is the background of the photo rather than a part of the background of the image. Therefore, after the processing device 104 captures a foreground face from the foreground, the surrounding of the foreground face may be utilized for determining whether the foreground face is authentic or not. When the surrounding of the foreground face is the background of the image, the processing device 104 determines that the face is authentic. In contrast, when the surrounding of the foreground face is not the background of the image, the processing device 104 determines that the face is not authentic.

Figures 5, 6:
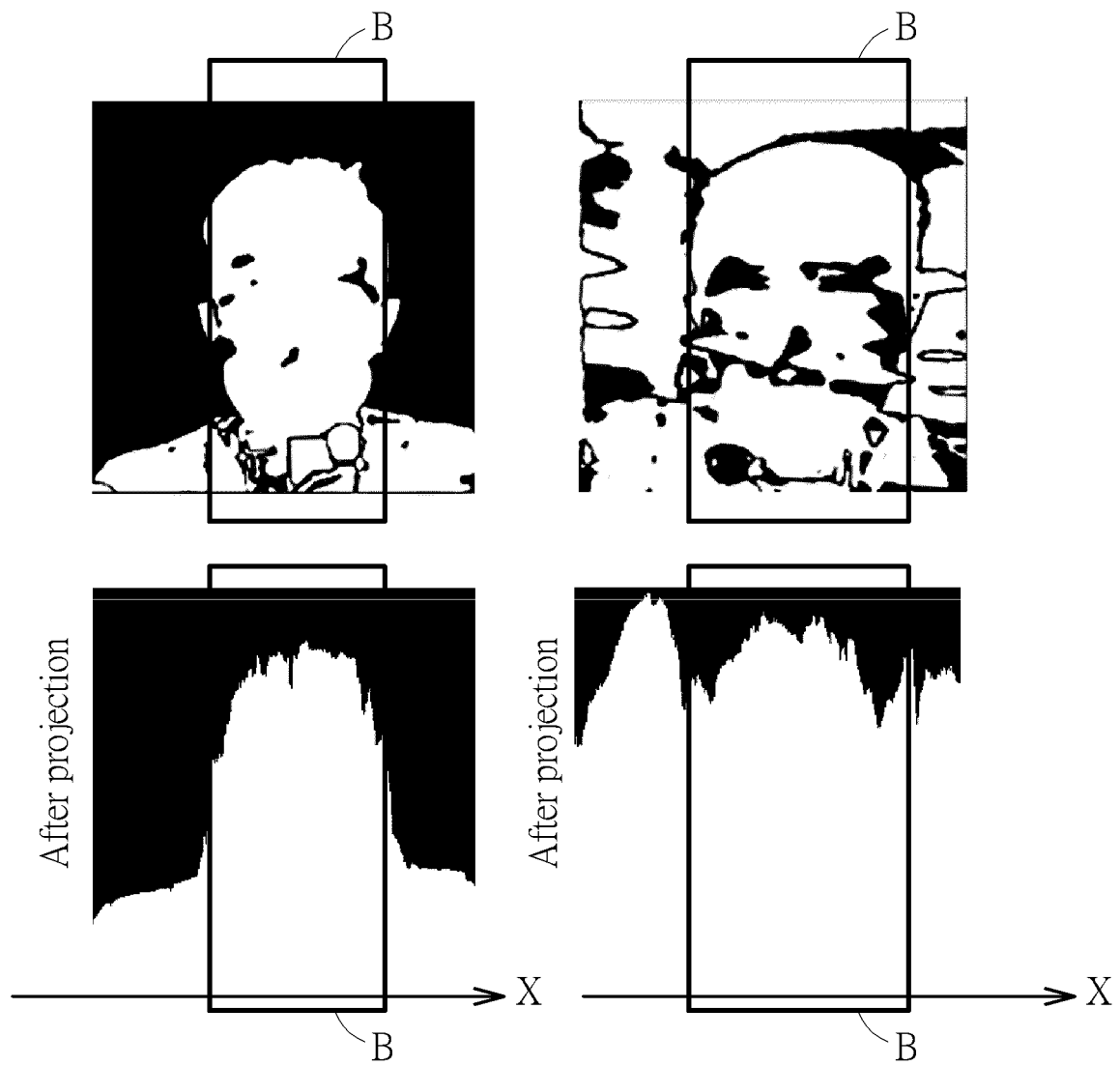
FIG. 5 is a schematic diagram of a foreground with the authentic face after a pixel projection according to an embodiment of the present invention.
FIG. 6 is a schematic diagram of the foreground with the photo face after the pixel projection.

Regarding a method of determining whether the face is authentic or not by the processing device 104, in an embodiment, a deep learning algorithm or a support vector machine (SVM) algorithm may be utilized for determining whether the face is authentic or not. Or, in another embodiment, the processing device 104 may perform a pixel projection for the foreground to determine whether the face is authentic or not. Please refer to FIG. 5 and FIG. 6. FIG. 5 is a schematic diagram of a foreground with the authentic face after a pixel projection according to an embodiment of the present invention. FIG. 6 is a schematic diagram of the foreground with the photo face after the pixel projection. In the examples of FIG. 5 and FIG. 6, when the processing device 104 vertically projects the pixels of the foreground onto an x-axis, more noises exist in the middle of the authentic face of the foreground in FIG. 5 and fewer noises exist at both sides of the face. In comparison, in the photo face the foreground of FIG. 6, noises exist in middle and at both of sides of the face, and the noises are distributed uniformly. Therefore, the processing device 104 of the present invention may distinguish whether the face in the image is authentic or not with the above mentioned method.

In an embodiment, a boundary B may be determined by the face width of the landmark in the foreground. When a noise region outside the boundary B is less than 50%, the face in the foreground may be determined as authentic. In contrast, when the noise region outside the boundary B is greater than 50%, the face in the foreground may be determined as not authentic. Therefore, the computer system 10 of the present invention may effectively recognize the authentic face by the conventional face recognition system, which is only equipped with the RGB camera, to improve the safety of face recognition. Notably, a size of the boundary B is not limited the face width of the landmark, apart of the landmark or other sizes are also applicable to the present invention.

Figure 7:
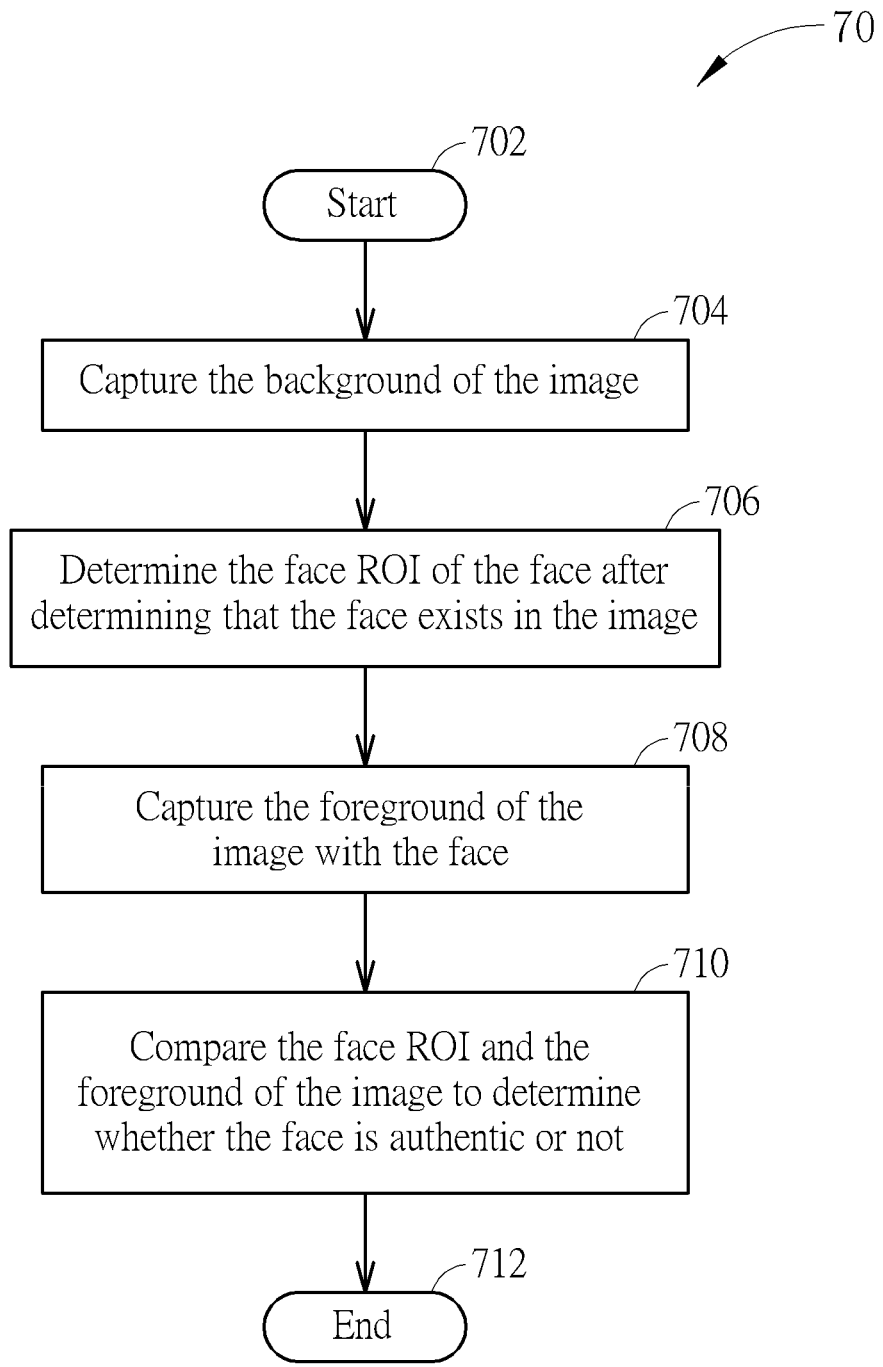
FIG. 7 is a schematic diagram of a face recognition process according to an embodiment of the present invention.

Furthermore, an operation method of the computer system 10 may be summarized as a face recognition process 70, as shown in FIG. 7. The face recognition process 70 includes the following steps:

Step 702: Start.

Step 704: Capture the background of the image.

Step 706: Determine the face ROI of the face after determining that the face exists in the image.

Step 708: Capture the foreground of the image with the face.

Step 710: Compare the face ROI and the foreground of the image to determine whether the face is authentic or not.

Step 712: End.

Regarding operations of the face recognition process 70, please refer to the above mentioned embodiments of the computer system 10, and not narrated herein again for brevity.

In summary, embodiments of the present invention provide a face recognition method and computer system thereof, which utilize characteristics of image background to distinguish authentic faces and photo faces, so as to effectively recognize whether the face in front of the camera is authentic or not.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A face recognition method, comprising:
capturing an image;
after determining that a face exists in the image, determining a face region of interest (ROI) of the face;
capturing a foreground of the image with the face; and
comparing the face ROI and the foreground of the image to determine whether the face is authentic or not;
wherein the step of comparing the face ROI and the foreground of the image to determine whether the face is authentic or not comprises:
determining a foreground face in the foreground to determine whether the foreground face is authentic or not.

2. The face recognition method of claim 1, wherein the step of after determining that the face exists in the image, determining the face ROI of the face comprises:

obtaining a size of the face to determine a landmark of the face; and shrinking or enlarging the face based on a width of the face to determine the face ROI based on the landmark.

3. The face recognition method of claim 1, further comprising:

determining that the face is authentic, when a surrounding of the foreground face is a background of the image; and determining that the face is not authentic, when the surrounding of the foreground face is not the background of the image.

4. The face recognition method of claim 1, wherein the step of capturing the foreground face in the foreground to determine whether the foreground face is authentic or not comprises:

determining whether the face is authentic or not based on a deep learning algorithm or a support vector machine (SVM) algorithm.

5. The face recognition method of claim 1, wherein the step of capturing the foreground face in the foreground to determine whether the foreground face is authentic or not comprises:

performing a pixel projection for the foreground to determine whether the face is authentic or not.

6. A computer system, for executing a face recognition method, comprising:

an image capturing device, configured to capture an image; and a processing device, coupled to the image capturing device, configured to determine a background of the image; determine a face region of interest (ROI) of the face after determining that a face exists in the image; capture a foreground of the image with the face; and compare the face ROI and the foreground of the image to determine whether the face is authentic or not;

wherein the processing device determines a foreground face in the foreground to determine whether the foreground face is authentic or not.

7. The computer system of claim 6, wherein the processing device obtains a size of the face to determine a landmark of the face; and shrinks or enlarges the face based on a width of the face to determine the face ROI based on the landmark.

8. The computer system of claim 6, wherein the processing device determines that the face is authentic when a surrounding of the foreground face is the background of the image; and the processing device determines that the face is not authentic when the surrounding of the foreground face is not the background of the image.

9. The computer system of claim 6, wherein the processing device determines whether the face is authentic or not based on a deep learning algorithm or a support vector machine (SVM) algorithm.

10. The computer system of claim 6, wherein the processing device performs a pixel projection for the foreground to determine whether the face is authentic or not.

* * * * *